C. O. ANDERSON.
CENTRIFUGAL CREAM SEPARATOR.
APPLICATION FILED JUNE 15, 1915.
1,168,454.
Patented Jan. 18, 1916.
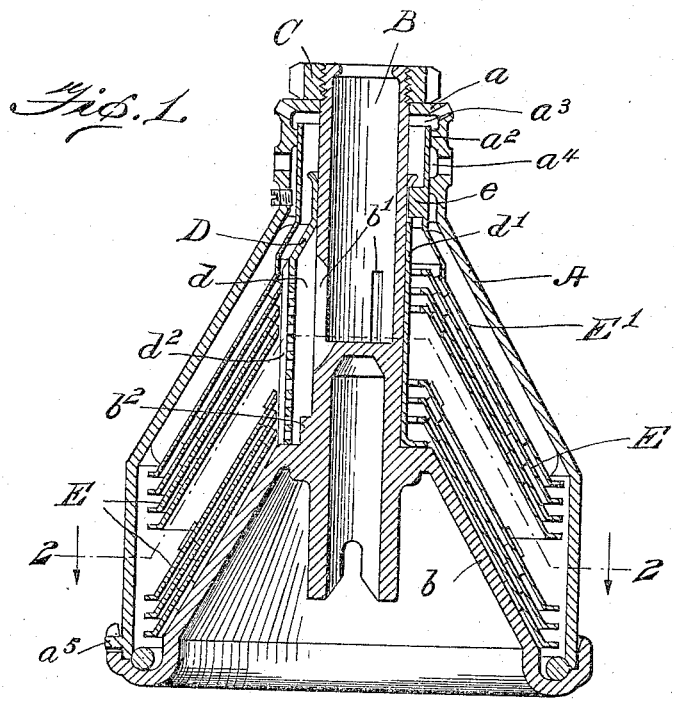
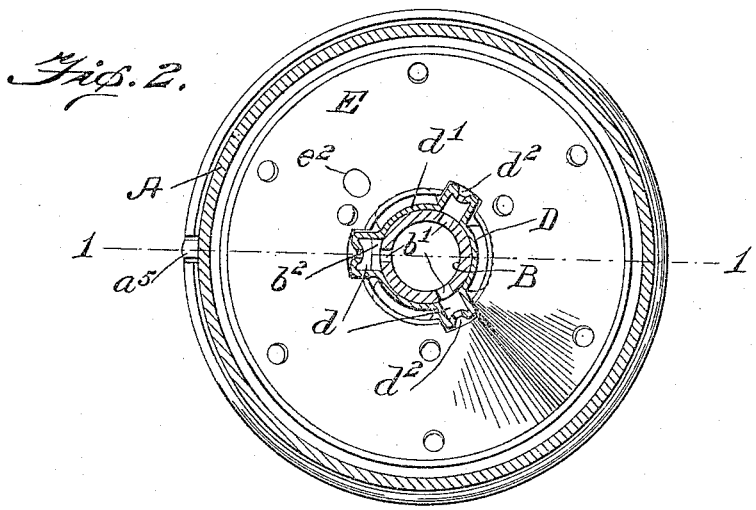

UNITED STATES PATENT OFFICE.

CARL OSCAR ANDERSON, OF LANCASTER, PENNSYLVANIA, ASSIGNOR TO THE CHAMPION BLOWER & FORGE COMPANY, OF LANCASTER, PENNSYLVANIA, A CORPORATION OF PENNSYLVANIA.

CENTRIFUGAL CREAM-SEPARATOR.

1,168,454.  Specification of Letters Patent.  Patented Jan. 18, 1916.

Application filed June 15, 1915. Serial No. 34,263.

*To all whom it may concern:*

Be it known that I, CARL OSCAR ANDERSON, a citizen of the United States, residing at Lancaster, in the county of Lancaster and State of Pennsylvania, have invented certain new and useful Improvements in Centrifugal Cream-Separators; and I hereby declare that the following is a full, clear, and exact description thereof, reference being had to the accompanying drawings, which form part of this specification.

This invention relates to centrifugal cream separators, and more particularly to machines of the type in which a series of frusto-conical separating disks are employed together with a centrally disposed feed-tube and an interposed receiving and distributing device from which the whole milk is discharged between the separating disks.

The objects of the invention are to provide a simple, efficient and inexpensive centrifugal cream separator, with improved means for distributing the whole milk in such manner that substantially the same quantity of milk will be conducted into each of the spaces between the separating disks, so as to effect an even and uniform distribution, thereby insuring a more perfect separation of the skimmed milk and cream and greatly increasing the efficiency of such machines.

The invention will first be hereinafter more particularly described, with reference to the accompanying drawings, which form a part of this specification, and then pointed out in the claims at the end of the description.

In said drawings, Figure 1 is a vertical sectional elevation of a centrifugal cream separator embodying my invention; the section being taken on the line 1—1 of Fig. 2; and Fig. 2 is a transverse section, taken on the line 2—2 of Fig. 1.

Referring to said drawings, in which the same reference letters are used to denote corresponding parts in different views, the letter A may denote an outer casing or bowl, which is preferably of cylindro-conical form and is supported at its lower end on an outwardly flaring or conical base $b$, of a centrally disposed feed-tube B; the joint between the bowl and base being effectually closed by a suitable packing ring resting in an annular groove in the base within a circumferential flange thereon, as shown. The
bowl A may be secured on the base with provision for easily detaching it, to permit the removal or insertion of the liner and cooperating parts, by providing exterior threads on the upper end of the feed-pipe for engagement with a nut C screwed thereon, the neck of the bowl surrounding the feed-tube being provided with an interior annular end-flange $a$, the bore of which adapts it to fit closely around the feed-tube while the nut C bears thereon so as to force and hold the bowl firmly to its seat on the base $b$. These parts, however, are of common form in the art, and are not claimed herein. Any other suitable form may be employed. The feed-tube B is preferably formed integrally with a depending tubular portion or socket to receive the upper end of a vertical shaft or spindle (not shown) upon which the bowl is revolubly supported in a well-known manner in this class of machines. Slots or apertures $b^1$ are provided in the feed-tube, which preferably extend upwardly from the bottom of the socket or milk passage therein and are flared outwardly at opposite ends to facilitate the discharge of the milk. The slots or openings through the feed-tube are spaced apart, preferably equidistant, and arranged to discharge into vertically disposed channels of a distributing device D, which is slidably fitted on the feed-tube with its lower end resting on an annular shoulder at the apex of the cone-shaped base $b$, or the junction of said base with the feed-tube.

The distributing device D consists essentially of a tubular body or sleeve surrounding the feed-tube and having integral radially extending hollow projections $d$, forming vertically disposed trough-like channels with open sides each facing one of the slots $b^1$, or a series of apertures in the feed-tube, while their intermediate portions $d^1$ fit closely against the feed-tube between said projections; the latter being provided in their outer walls with a series of perforations each adapted to register with one of the spaces between the separating disks or plates of the liner, so as to evenly and uniformly distribute the whole milk issuing through the openings in the feed-tube between the series of plates. The outer perforated walls of the projections $d$ preferably extend beyond the cream zone, lying within the circle described by the margins of the openings through the apices of the conical plates of the liner, and said outer walls are preferably so formed as to provide a vertically disposed channel or groove $d^2$ coincident with the series of perforations in the outer wall of the projection. The vertically disposed channels formed by the radial projections $d$ are adapted to cause the milk to travel along the inner side wall thereof, rearwardly in respect to the direction of rotation, so that the milk will be uniformly distributed over the surface of such wall throughout the length of the channel before it reaches the perforations in the outer wall, and the milk issuing through said perforations into the vertical grooves $d^2$ will be spread out in a thin layer along the outer side of said outer wall and pass thence into the spaces between the plates of the liner, thus effecting a uniform and even distribution of the milk in condition for effectually separating the cream, which is caused to pass up the sides of the distributing device between the hollow projections and out at the top of the bowl. The channels in the hollow projections are preferably open at their lower ends, but normally closed by close contact with the annular shoulder on which the sleeve rests, while the upper ends of said channels are closed by means of a reduced tubular extension of the upper end of the distributing sleeve forming a neck which is fitted closely around the feed-tube, so that no milk can escape from said distributing sleeve except through the perforations in the outer walls of the hollow projections thereon. In practice, three of said hollow projections have given the best results, but a greater or less number may be employed, and one of them is preferably wider than the other two for engagement with a notch in the inner edge of the separating disks surrounding the sleeve for the purpose hereinafter stated.

In order that the distributing device or sleeve may be caused to rotate with the feed-tube, it may be keyed thereto by means of a lug or pin $b^2$ on the feed-tube projecting into one of the trough-like channels in one of said hollow projections, preferably the wider channel, for convenience in assembling. Within the bowl A, and around the distributing sleeve D are placed a series of frusto-conical separating disks E each having a cylindrical opening at its apex of such size as to adapt it to fit over the distributing sleeve and leave an unobstructed space surrounding the sleeve between the hollow projections for the passage of the cream ascending to the cream exit. The disks E are slightly separated and the circular openings through their apices are larger than and adapted to fit over the distributing sleeve D and are also notched to receive the projections $d$ on the sleeve and so arranged that the spaces therebetween are each directly opposite a perforation in each of the vertically disposed distributing channels, so as to insure a uniform and equal distribution of the milk between said disks. One of the radial projections on the sleeve D is preferably wider than the others, while one of the notches in each disk is wider than the other notches and registers with the wider projection, so as to adapt the bowl or casing to be placed on the base in one position only and prevent rotation of one independently of the other. The uppermost separating disk $E^1$ has a tubular neck or extension which is slightly larger than and surrounds the feed-tube within the neck of the casing, to provide a cream passage therethrough, and is adapted to fit closely against an annular rib or flange $a^2$ on the interior of the casing neck. On opposite sides of said rib annular channels $a^3$ and $a^4$, are provided, the upper one being in communication with the cream passage through the open end of the neck of the disk and with a cream exit or exits in the casing neck, while the lower channel is in communication with the skimmed milk passage or space between the uppermost disk $E^1$ and the interior wall of the casing and with a skimmed milk exit or exits in the casing neck.

A stud or projection $e$, on the interior of the neck of the disk $E^1$ engages an open-ended slot in the upper end of the neck of the sleeve D, to adapt the latter to rotate with said disk, which in turn is caused to rotate with the series of separating disks surrounding the sleeve by the engagement of the radial projections $d$ with the notches in the series of disks. This construction permits the disk $E^1$ to be withdrawn or disconnected from the sleeve by endwise movement thereof with the bowl or casing in which it is inclosed, or independently thereof, when the bowl is removed, and the entire series of disks are removable bodily with the sleeve, or one by one, as desired. The several disks may be provided with registering apertures, as indicated at $e^2$, arranged one above another, or in line, so as to form a straight passage vertically through the series of disks parallel with the axis of the bowl, to receive a tool for holding the disks together when they are being washed. An open-ended slot may be formed in the circumferential flange of the flaring base to receive a stud or pin $a^5$ projecting outwardly from the lower end of the bowl A so as to require assembling in the same position each turn and prevent rotation of one independently of the other.

It will be understood of course that the application of my invention is not limited to any particular form or arrangement of separating disks, as various other well-known forms may be employed.

The present invention is designed as an improvement upon the cream separator which forms the subject-matter of my application Serial No. 863,891 filed September 28, 1914.

Having thus described my invention, what I claim as new and desire to secure by Letters Patent is:

1. A cream separator, comprising a bowl or casing, a centrally disposed feed-tube projecting through a neck of the casing and having lateral discharge openings therein, a series of superposed separating disks surrounding said feed-tube, and an interposed distributing device consisting of a substantially tubular body or sleeve having radially extending hollow projections having outer perforated walls and open sides facing the discharge openings in said tube, so as to form vertically disposed distributing channels; said sleeve having a tubular neck closely fitting said tube and closing the upper end of said channels, which are open at their lower ends, and said feed-tube having an annular shoulder on which said sleeve rests, thereby normally closing the lower ends of said channels.

2. In combination, a bowl provided with a centrally disposed feed-tube having vertically disposed slots therein, a distributing sleeve surrounding said tube having spaced integral hollow projections with perforations in their outer walls and forming vertically disposed distributing channels having open sides facing the slots in said sleeve; the parts of the sleeve between said projections fitting closely against said tube, and separating disks surrounding said sleeve adapted to receive therebetween the milk issuing through said perforations; said sleeve being open at its lower end and resting upon an annular shoulder on the feed-tube normally closing the lower ends of said channels, which are also closed at their upper ends.

3. In a cream separator, a distributing device consisting of a substantially tubular body or sleeve adapted to fit around a feed-tube, and having a plurality of radially extending hollow projections forming vertically disposed channels with open sides adapted to face discharge apertures in the feed-tube; the outer walls of said projections being perforated and having vertically disposed grooves in their outer sides.

4. In combination with a feed-tube having a series of discharge apertures therein spaced apart around the tube, a distributing sleeve fitting closely against said tube and between said discharge apertures and having a series of radially extending hollow projections with outer perforated walls forming vertically disposed trough-like channels with open sides facing said apertures; said outer walls having exterior vertically disposed grooves therein and said sleeve having both ends normally closed.

In testimony that I claim the foregoing as my own, I affix my signature in presence of two witnesses.

CARL OSCAR ANDERSON.

Witnesses:
  CHAS. E. LONG,
  ARTHUR M. SMITH.

Copies of this patent may be obtained for five cents each, by addressing the "Commissioner of Patents, Washington, D. C."